United States Patent
Robinson (10) Patent No.: US 10,617,113 B2
(45) Date of Patent: Apr. 14, 2020

(54) FREE-FLOW, ANIMAL BLOCKING DRAIN PIPE END CAP

(71) Applicant: Wilbur D. Robinson, Canandaigua, NY (US)

(72) Inventor: Wilbur D. Robinson, Canandaigua, NY (US)

(73) Assignee: Wilbur Duane Robinson, Canandaigua, NY (US)

(*) Notice: Subject to any disclaimer, the term of this patent is extended or adjusted under 35 U.S.C. 154(b) by 172 days.

(21) Appl. No.: 15/849,822

(22) Filed: Dec. 21, 2017

(65) Prior Publication Data

US 2018/0177179 A1 Jun. 28, 2018

Related U.S. Application Data

(60) Provisional application No. 62/438,301, filed on Dec. 22, 2016.

(51) Int. Cl.
*A01M 29/30* (2011.01)
*E04D 13/08* (2006.01)
*E03F 7/06* (2006.01)
*F16L 37/084* (2006.01)
*F16K 15/14* (2006.01)

(52) U.S. Cl.
CPC ............ *A01M 29/30* (2013.01); *E03F 7/06* (2013.01); *E04D 13/08* (2013.01); *E04D 2013/0806* (2013.01); *F16K 15/144* (2013.01); *F16L 37/0847* (2013.01)

(58) Field of Classification Search
CPC ............................. F16K 15/03; A01M 29/30
See application file for complete search history.

(56) References Cited

U.S. PATENT DOCUMENTS

| | | | | |
|---|---|---|---|---|
| 1,348,562 A * | 8/1920 | Hauser | ................ | F16K 15/03 137/527.8 |
| 2,882,923 A * | 4/1959 | Smolensky | ............... | E03F 7/04 137/515.5 |
| 3,295,547 A * | 1/1967 | Scaramucci | .......... | F16K 15/144 137/315.33 |
| 4,039,004 A * | 8/1977 | Luthy | ..................... | F16K 15/03 137/527 |
| 4,605,041 A * | 8/1986 | Teumer | ............... | F16K 27/0227 137/515.7 |
| D301,164 S * | 5/1989 | Weaver | ............................ | 52/16 |
| 4,942,898 A * | 7/1990 | Osowski | ................. | E01F 5/005 137/454.2 |
| 8,459,298 B1* | 6/2013 | Valdez | .................... | F16K 15/03 137/527.6 |
| 9,560,805 B2 * | 2/2017 | Hull | ........................ | F16K 15/03 |
| 2005/0092372 A1* | 5/2005 | Wade | ..................... | F16K 15/03 137/527.6 |
| 2011/0290349 A1* | 12/2011 | Cozens | ................... | E03F 5/042 137/527.6 |

* cited by examiner

Primary Examiner — Joshua T Kennedy (57) ABSTRACT

A one continuous resilient plastic moldable piece, intended to promote: a secure "Snap-on" connection to the outflow end of a corrugated plastic drain pipe, toward an unobstructed flow of effluent from, and toward a deterrence to rodent entry into same.

17 Claims, 12 Drawing Sheets

FREE-FLOW, ANIMAL BLOCKING DRAIN PIPE END CAP

CROSS-REFERENCE TO RELATED APPLICATIONS

This application claims priority to U.S. Provisional Patent Application Ser. No. 62/438,301 filed Dec. 22, 2016, the contents of which are incorporated by reference herein as if set forth in their entirety for all purposes as if put forth in full below.

STATEMENT REGARDING FEDERALLY SPONSORED RESEARCH OR DEVELOPMENT

None

THE NAMES OF THE PARTIES TO A JOINT RESEARCH AGREEMENT

None

BACKGROUND OF THE INVENTION

For as long as there have been drains and sewage systems there has been a problem of how to allow water and debris to exit drain pipes while preventing animals from entering the pipes. To this day, blockage due to animals, animal debris, and other debris is a problem in residential housing drainage and gutter systems, farm field drainage systems, golf courses drainage systems, and any place where corrugated polymer drainage and sewage pipes are used as part of a drainage system.

Drain pipe end caps with flaps to allow water and debris flow while preventing animals from entering the drain have been implemented in various forms over the years. Drain cap concepts suggest use of galvanized steel or some form of metal alloy and incorporate spring systems, metal alloy attachment systems, and include a significant number of moving parts. Most, if not all, require fasteners, tools, and even specialized skill to install and employ, all of which increases production and installation costs. and installation time. Many of these systems may be effective for larger animals but many appear less effective at keeping out mice, rats, snakes, and other smaller rodents or vermin.

Alternative options to drain pipe end caps are flaps, cages, slotted flaps, or forked flaps that are installed within a pipe, usually bolted to the top of the pipe or hinged between points at the pipe's inner surface perimeter. These solutions are intended to allow water and debris to flow out past the internal flap, while closing to prevent animals from venturing too far into the pipe. Since these solutions are usually made from a metal alloy, it becomes difficult to replace them if the mechanism breaks. Corrosion is a common reason for failure. Furthermore, these solutions need to be affixed to the pipe, requiring tools, fasteners, and skills, and these solutions collectively put strain on the pipe walls, over time making it likely that the pipe will break at or near the attachment point. These last two points are particularly significant as drainage pipes are costly and time consuming to replace, potentially requiring digging and replacing large sections of pipe.

The current invention provides a drain pipe end cap that is suited for use with a wide range of diameters of single or more walled corrugated polymer piping and smooth walled PVC pipes, most commonly used today and in the foreseeable future. It is a single piece, light-weight, durable, and easy to install and use in or on drain pipes. Furthermore, its single piece construction removes the need for installation tools, clamps, bolting systems, hinge mechanisms, and internal pipe installation. The invention allows for drainage flow of fluid and debris, while opposing animal incursions. Further the invention allows for inexpensive production and one piece molding methods.

BRIEF SUMMARY OF THE INVENTION

Disclosed herein is a drain pipe end cap for allowing water and debris flow but preventing animal access, comprising a coupler, at least one stopper, an aperture cover and a cover flap, wherein the drain pipe end cap is of a single piece construction.

Further disclosed in certain preferred embodiments is a drain pipe end cap having a coupler, at least one stopper, and at least one aperture cover. The coupler has a first end, a flanged second end, an outer surface, and an inner surface. The coupler has a pipe connector that is a male connector and/or a female connector. The at least one aperture cover is located at the first end of the coupler and/or at the flanged second end of the coupler, and/or at a position in between at the first end of the coupler and at the flanged second end of the coupler. The at least one aperture cover comprises a cover flap and the cover flap is connected to at least one point of the perimeter along the upper half of the inner surface of the aperture cover. The cover flap has an edge, an outer surface, and an inner surface. The coupler, the at least one stopper, the at least one aperture cover, the cover flap connection, and the cover flap are of a single piece construction.

Further disclosed is a drain pipe end cap having a coupler, at least one stopper, a sleeve and at least one aperture cover. The coupler has a first end, a shoulder end, an outer surface, and an inner surface. The sleeve covers the coupler, the sleeve extending from the shoulder end in the direction of the first end, and the sleeve has an outer surface and an inner surface. The sleeve has a substantially tubular configuration and the coupler has a substantially tubular configuration. The sleeve has a pipe connector and the coupler has a pipe connector with the pipe connector being a male connector and/or a female connector. The at least one aperture cover is located at the first end of the coupler and/or at the flanged second end of the coupler, and/or at a position in between at the first end of the coupler and at the flanged second end of the coupler. The at least one aperture cover comprises a cover flap. The cover flap is connected to at least one point of the perimeter along the upper half of the inner surface of the aperture cover with the cover flap having an edge, an outer surface, and an inner surface. The coupler, the sleeve, the at least one aperture cover, the cover flap connection, and the cover flap are of a single piece construction.

DETAILED DESCRIPTION

Before explaining some embodiments of the present invention in detail, it is to be understood that the invention is not limited in its application to the details of any particular embodiment shown or discussed herein since the invention comprises still further embodiments, as described by the granted claims.

Unless otherwise clearly specified the terminology used herein is for the purpose of description and not of limitation. Further, although certain methods are described with reference to certain steps that are presented herein in a certain order, in many instances, these steps may be performed in any order as may be appreciated by one skilled in the art, and the methods are not limited to the particular arrangement of steps disclosed herein.

As utilized herein, the following terms and expressions will be understood as follows:

The expression "circular" refers to a shape that is like a circle but may have variances, rounded edges, flared edges, or other irregularities due to machining or tool tolerance limits in the invention manufacturing process.

The expression "rectangular" refers to a shape that is like a rectangle but may have variances, rounded edges, flared edges, or other irregularities due to machining or tool tolerance limits in the invention manufacturing process.

The expression "square" refers to a shape that is like a square but may have variances, rounded edges, flared edges, or other irregularities due to machining or tool tolerance limits in the invention manufacturing process.

The expression "flex zone" refers to a single piece construction of two parts wherein the point, line, area, volume, or field of connection is bendable so that one of the two parts may rotationally move around the point, line, or field of connection or bend at or near the point, line, or area of connection.

The expression "functional contact" refers to the contact between an object and a plane but for unexpected wear, and variances or other irregularities due to machining or tool tolerance limits in the invention manufacturing process.

The expression "single piece construction" refers to an object that is a single, one piece, integral object, created from a single mold so as to have no removable or separating components, or is constructed so as to have no removable or separating components or parts.

The expression "substantially in the same plane" refers to the placement of the edges of two or more objects such that the objects are in the same plane or in the same plane but for variances or other irregularities due to machining or tool tolerance limits in the invention manufacturing process.

The expressions "substantially perpendicular" refers to the measurements or relationship of an object that is perpendicular to another object but for variances or other irregularities due to machining or tool tolerance limits in the invention manufacturing process.

Figure 1A:
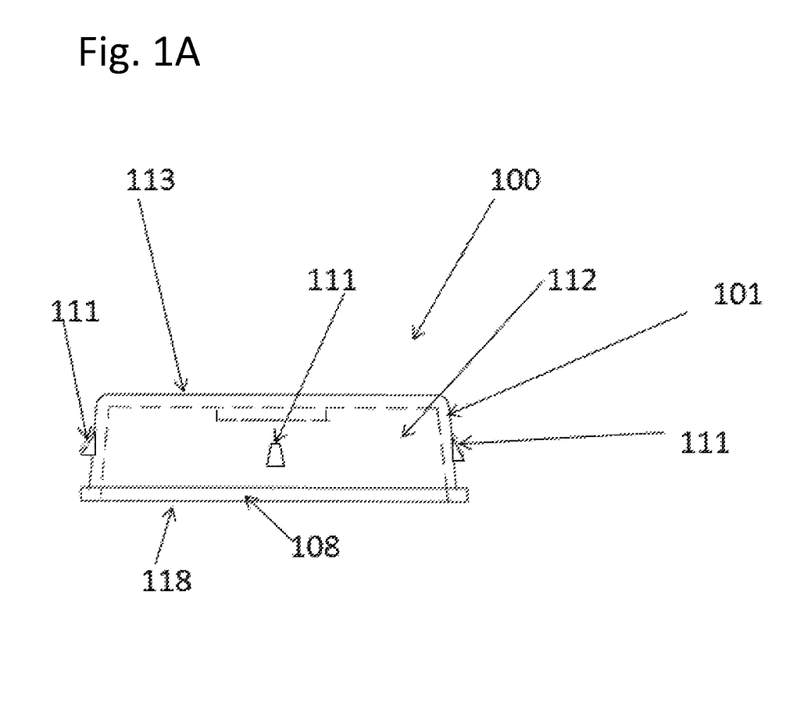
FIG. 1A depicts a top view of an embodiment of the current invention.
Figure 1B:
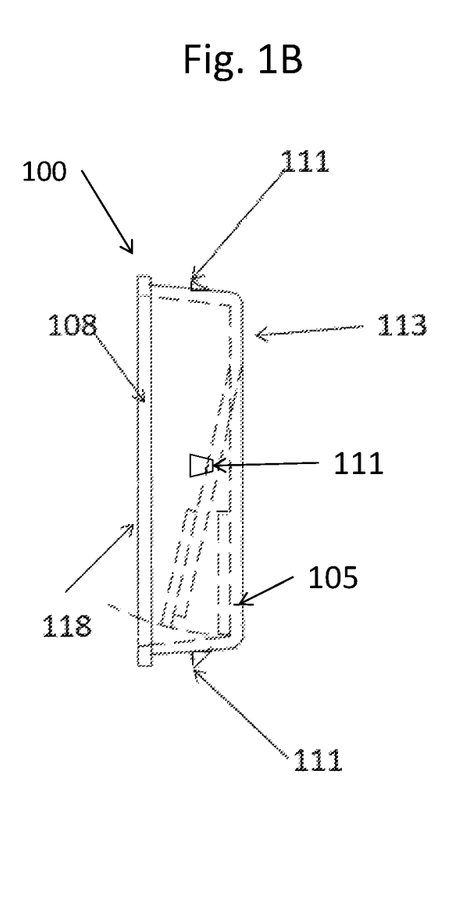
FIG. 1B depicts a side view of an embodiment of the current invention.
Figure 2:
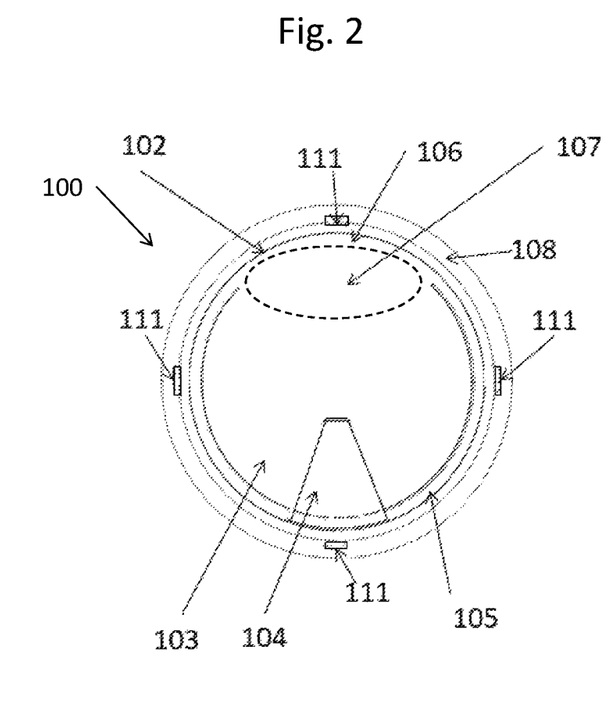
FIG. 2 depicts a frontal view of an embodiment of the current invention.

The invention herein will be better understood by reference to the figures wherein like reference numbers refer to like components. FIG. 1A, FIG. 1B, and FIG. 2 illustrate a three dimensional view of an embodiment of a drain pipe end cap (100). FIG. 1A is a top view. FIG. 1B is a side view. FIG. 2 is a front view. FIG. 1A shows a coupler (101) and a protrusion (111). In this embodiment the coupler (101) is a male connector (112), with a first end (113), a flange (108), and a flanged second end (118). FIG. 2 shows the aperture cover (102), the cover flap (103), the stopper (104), the lip (105), a flange (108), protrusions (111), a cover flap connection (106), and a flex zone (107). The cover flap connection (106) in this embodiment is part of the lip (105) as well as the cover flap (103). In this view, the outer lip surface of the lip (105) is visible. FIG. 1B shows protrusions (111) for connection to a corrugated pipe (110) (see FIG. 3). Also shown is a lip (105), a first end (113) and a flanged second end (118). The flange (108) extends sufficiently to prevent the drain pipe end cap (100) from moving into the pipe (110) (see FIG. 3) and the protrusions (111) extend outwards so that the end cap (100) snaps securely into the end of the corrugated pipe (110) (see FIG. 3).

Figure 3:
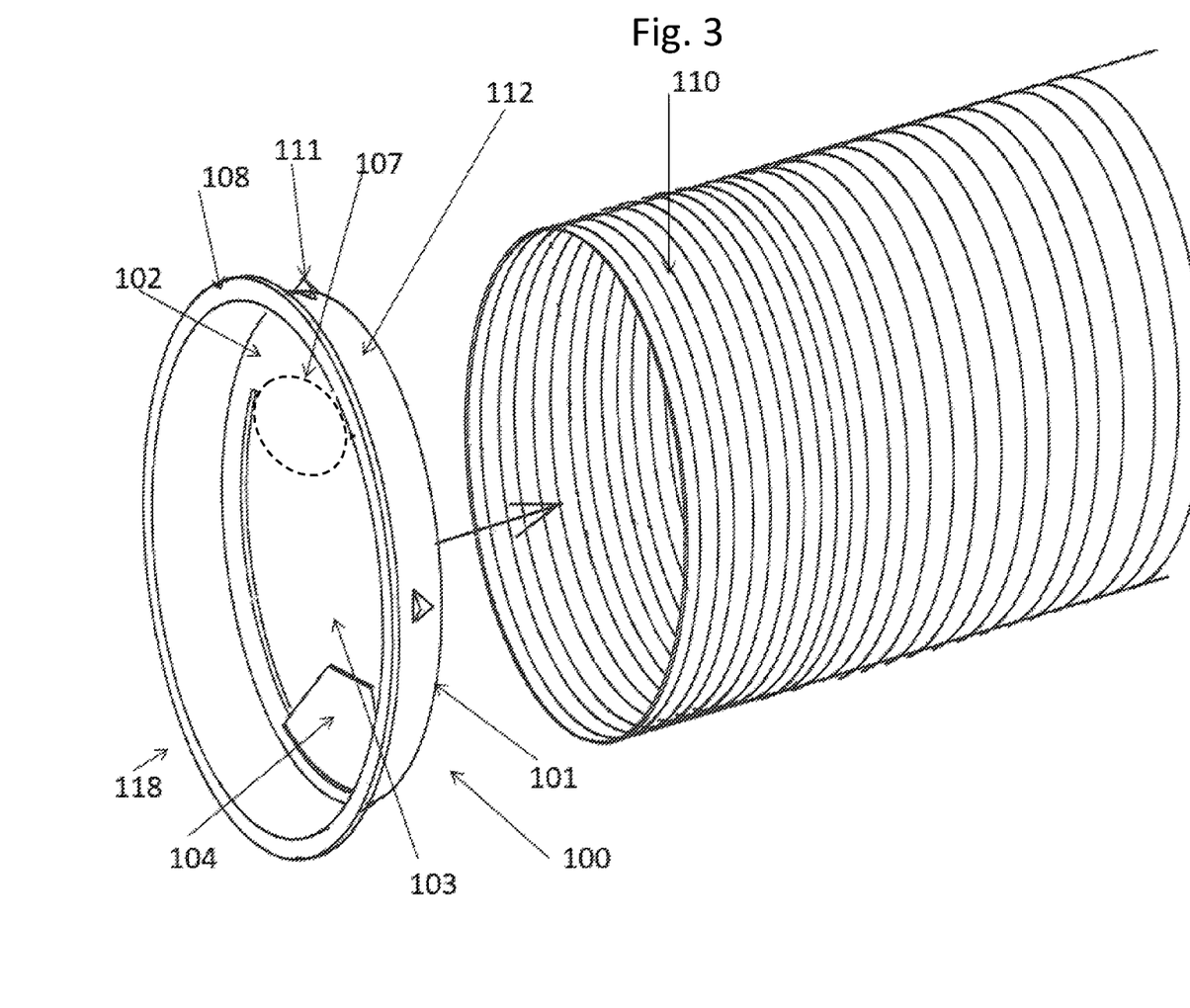
FIG. 3 depicts a perspective drawing of an embodiment of the invention with a male connection and placement in relation to a common corrugated pipe.

FIG. 3 illustrates a perspective view of a drain pipe end cap (100) in a male connector embodiment (112) of the coupler (101) positioned ready for insertion into and in relation to a corrugated pipe (110). The invention comprises an aperture cover (102), a cover flap (103), a stopper (104), a flange (108), the flanged second end (118), a protrusion (111), and a flex zone (107). Further indicated in this illustration is the positioning of the invention for insertion into the end of a corrugated pipe (110).

Figure 4:
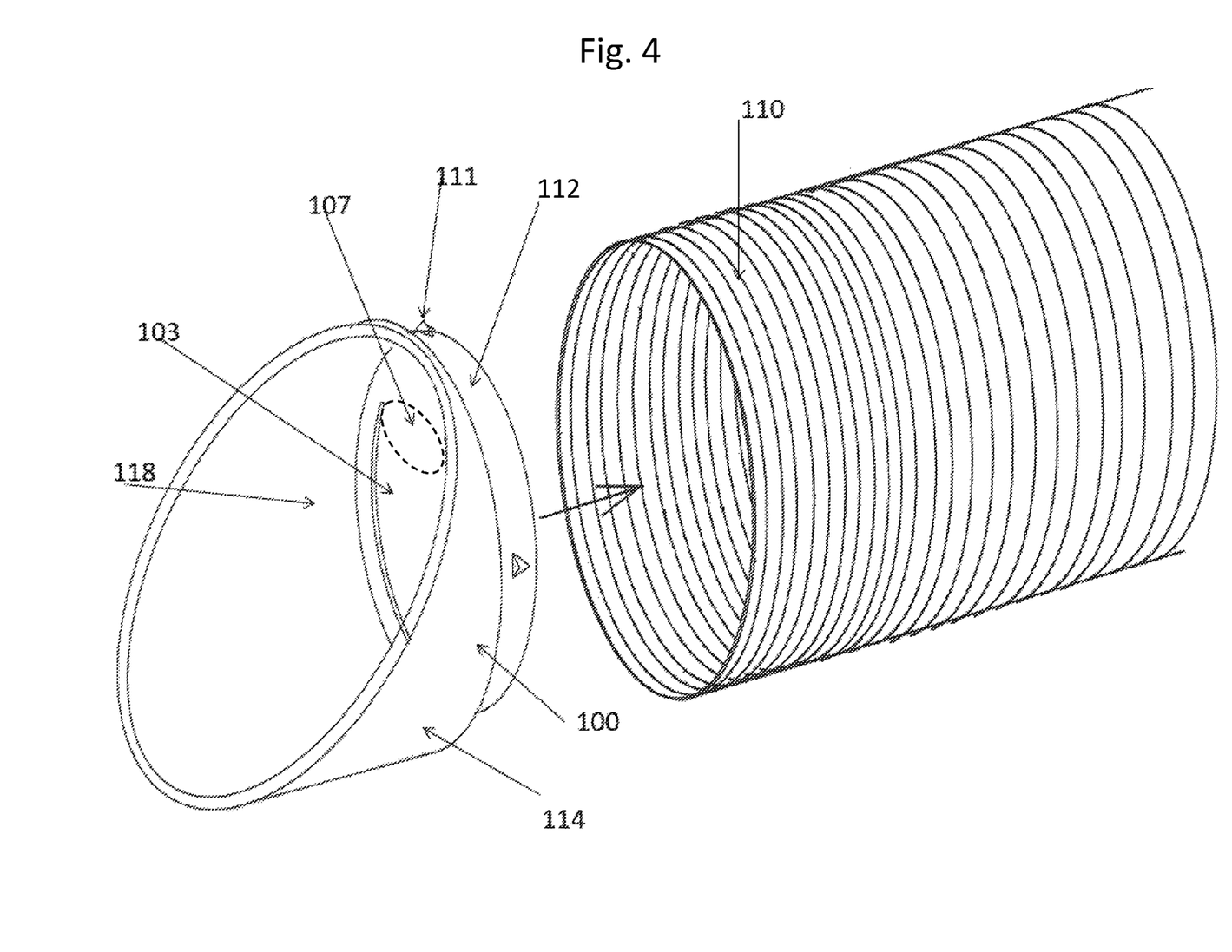
FIG. 4 depicts a perspective drawing of an embodiment of the invention with a male connection and an angled outlet, and placement in relation to a common corrugated pipe.

FIG. 4 illustrates a perspective view of an embodiment of the invention with an angled outlet (114). An angled outlet (114) may also be known as a sloped outlet. Also shown are the male connector (112), protrusions (111), a cover flap (103), a flanged second end (118), and a flex zone (107). The drain pipe end cap (100) is shown positioned for insertion into a corrugated pipe (110). The flanged second end (118) is angled or sloped.

Figure 5:
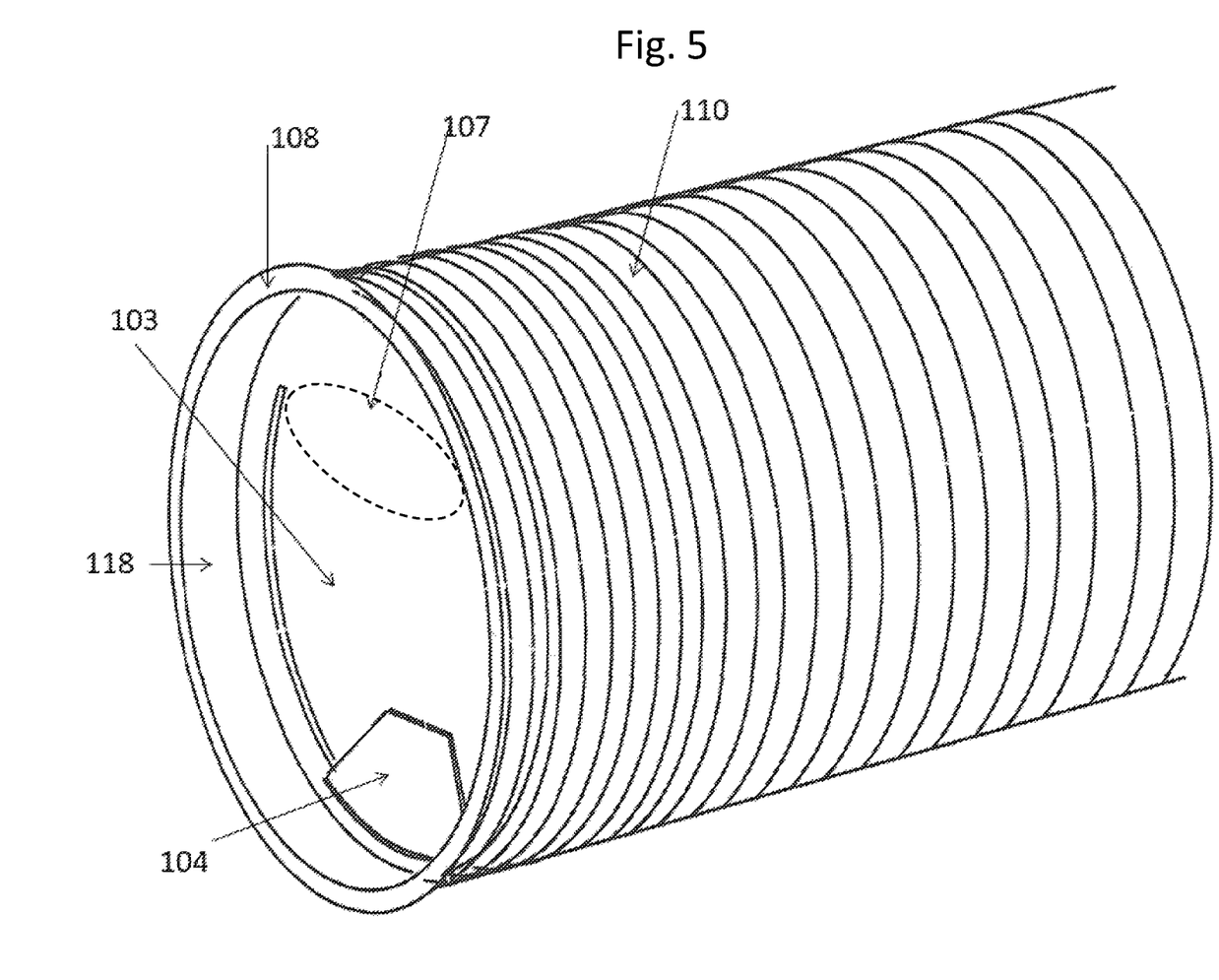
FIG. 5 depicts a perspective drawing of an embodiment of the current invention connected into a corrugated pipe.

FIG. 5 illustrates a perspective view of the invention inserted into a corrugated pipe (110). Also shown are a cover flap (103), a stopper (104), a flange (108), and a flex zone (107), a flanged second end, and wherein the corrugated pipe (110) is represented as a common corrugated single-walled pipe.

Figure 6:
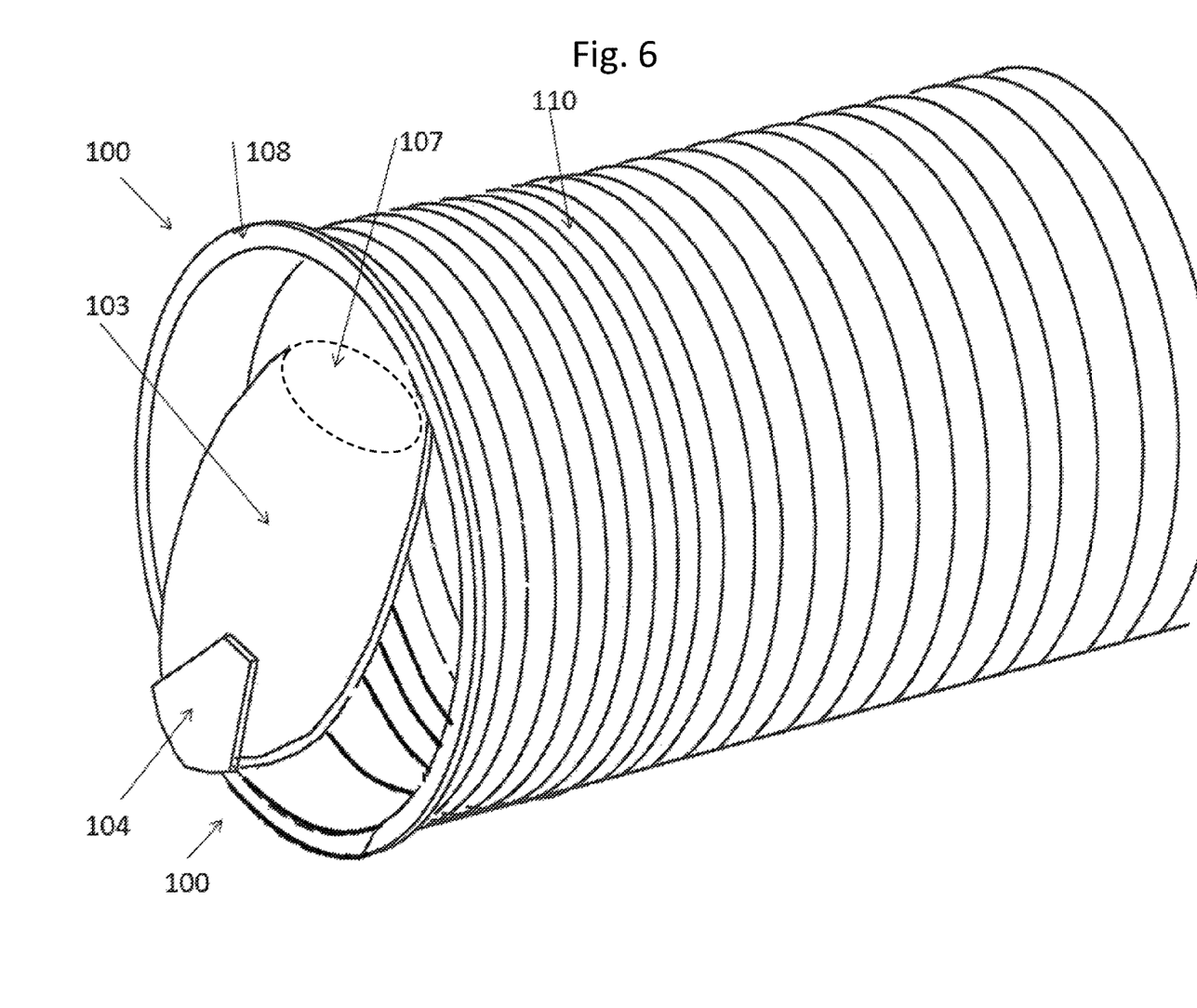
FIG. 6 depicts an embodiment of the current invention with an open cover flap.

FIG. 6 illustrates a perspective view of the end cap (100) inserted into a corrugated pipe (110), with an open cover flap (103). Further shown are a stopper (104), a flange (108), and a depiction of flexing at or around the flex zone (107).

Figure 7:
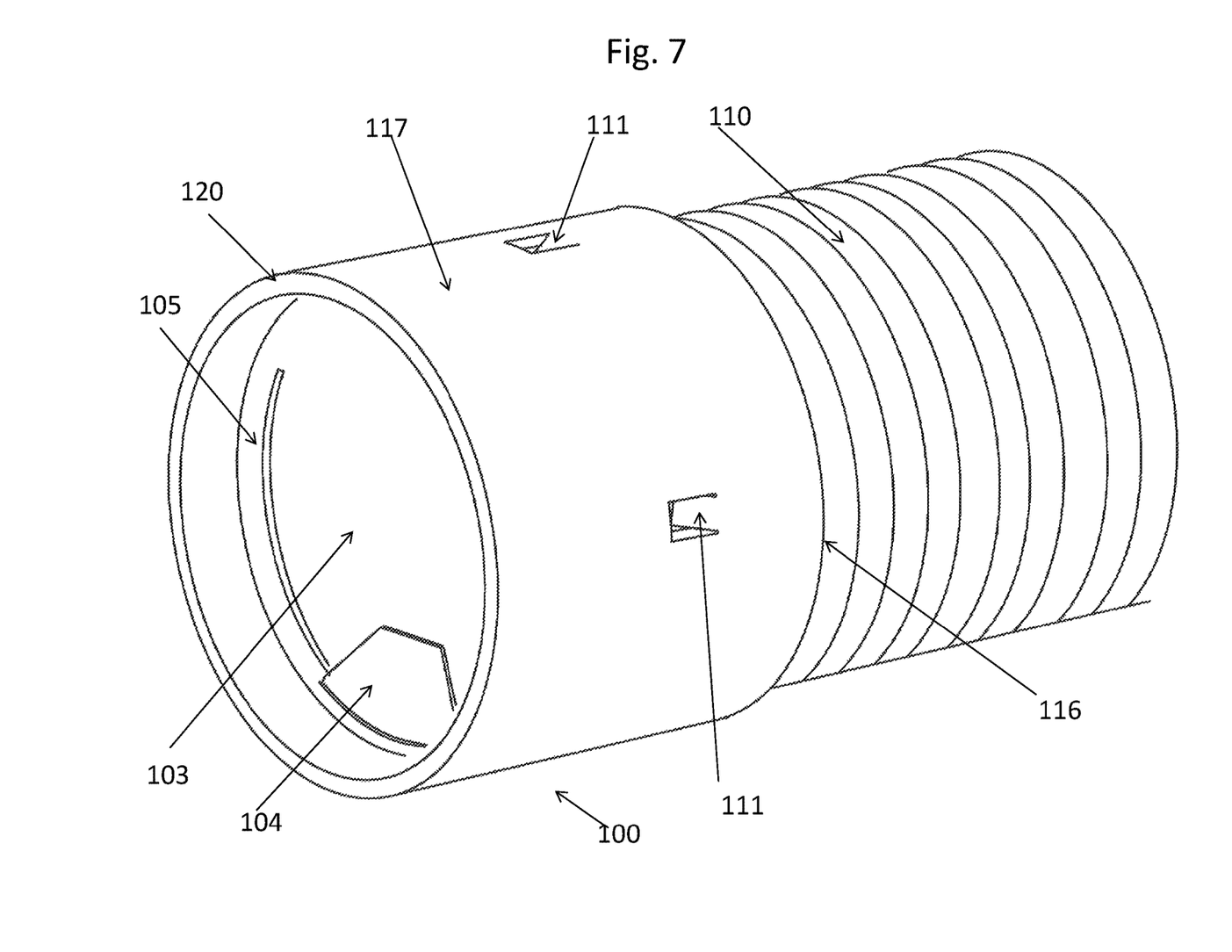
FIG. 7 depicts a perspective view of an embodiment of the current invention with a female connection.

FIG. 7 illustrates a perspective view of an embodiment of the invention with a sleeve (117) acting as a female connector (116) for connecting externally to a common corrugated pipe. Labelled and depicted are the inward facing protrusions (111) of the sleeve (117) acting as a female connector (116). The sleeve (117) in this configuration is molded and is not a separate piece from the end cap (100). In this embodiment, the sleeve (117) extends from the shoulder (120). The shoulder (120) includes the flanged portion of the coupler from which the sleeve (117) extends. The sleeve extends from the shoulder in the direction of the first end of the coupler (not shown) and may extend beyond the first end (113) of the coupler.

Figure 8:
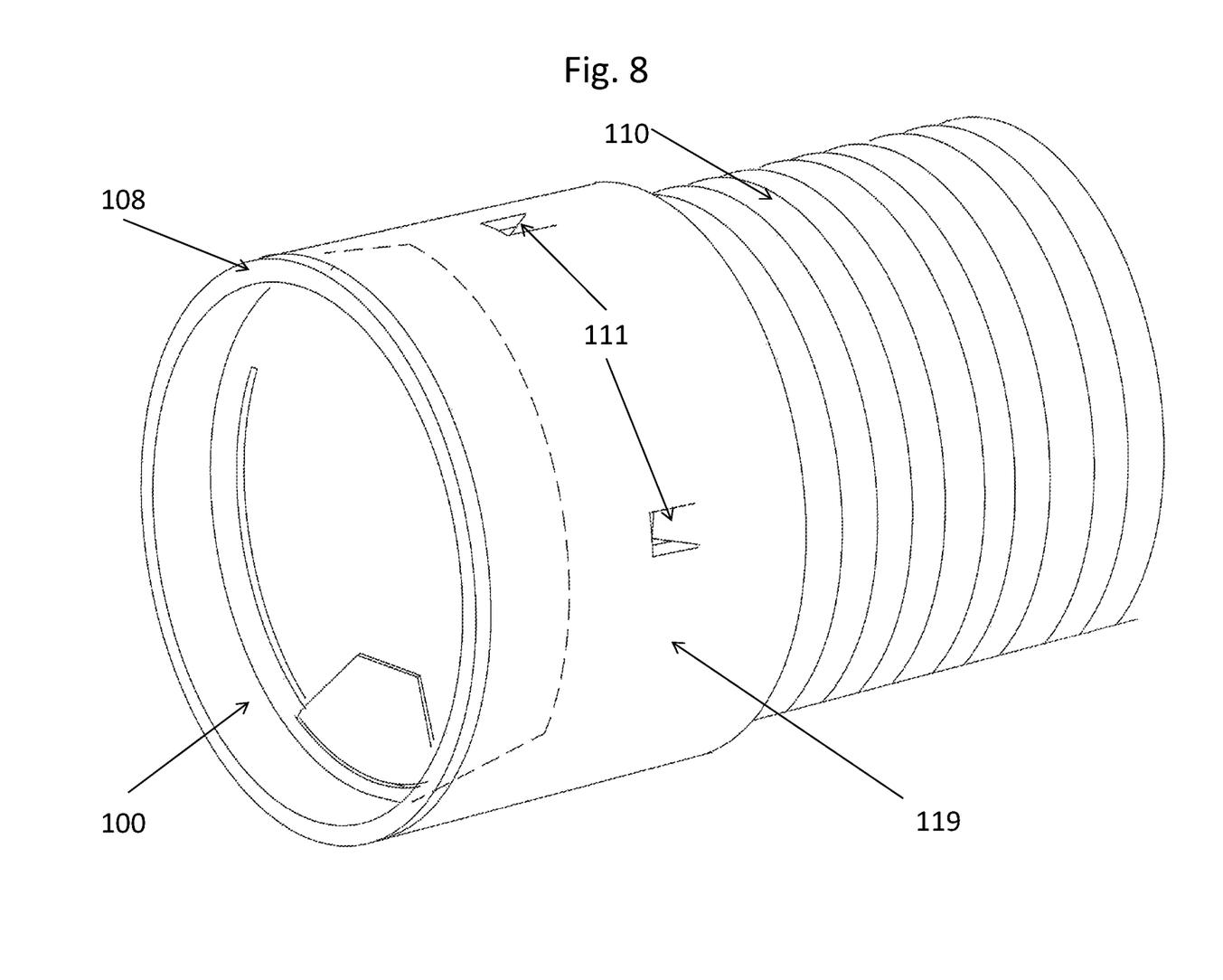
FIG. 8 depicts a perspective view of an embodiment of the current invention where the sleeve and female connections are an adapter for connection to the exterior of a corrugated pipe.

FIG. 8 illustrates a perspective view of an end cap (100) with a separate detachable sleeve (119) in contact with a flange (108). The detachable sleeve (119) is used as an adapter wherein the end cap (100) is connected to the detachable sleeve (119) and the detachable sleeve (119), with protrusions (111), connects to the outer surface of the corrugated pipe (110). The corrugated pipe (110) may be a single-walled pipe, double-walled pipe, or multi-walled pipe.

Figure 9:
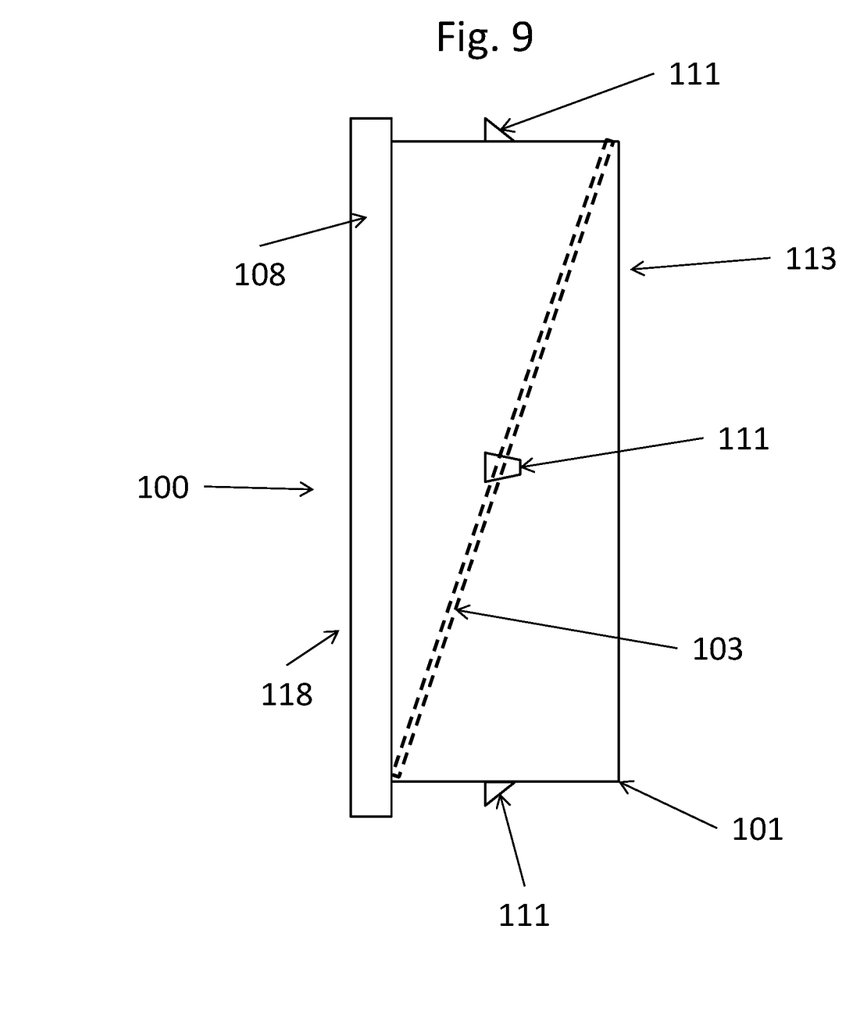
FIG. 9 depicts a side view illustrating the current invention with an angled configuration of a cover flap.

FIG. 9 illustrates a side view of an angled configuration embodiment of the end cap (100). Shown is a coupler (101) with protrusions (111) for connection to a corrugated pipe (not shown). Also shown are the first end (113) and the flanged second end (118). The flange (108) extends sufficiently to prevent the drain pipe end cap (100) from moving into a pipe and the protrusions (111) extend outwards so that the end cap (100) snaps securely into the end of a corrugated pipe. Also depicted, in a hidden view, is a cover flap (103) in a closed position where the closed position is at an angle to the coupler (101) walls.

Figure 10A:
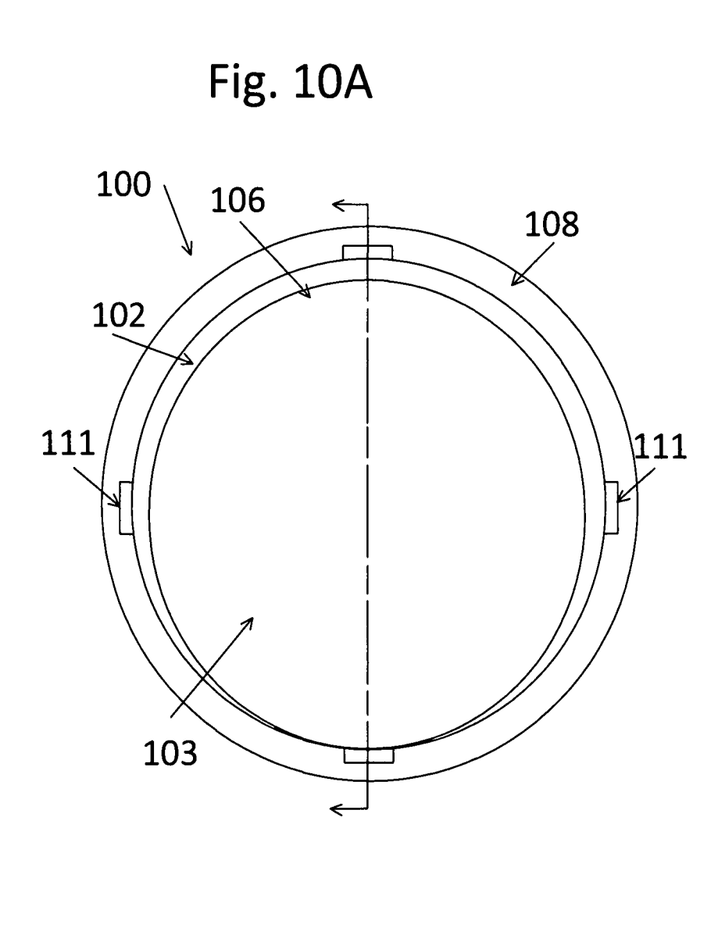
FIG. 10A depicts a front view of a cover flap in an angled configuration.
Figure 10B:
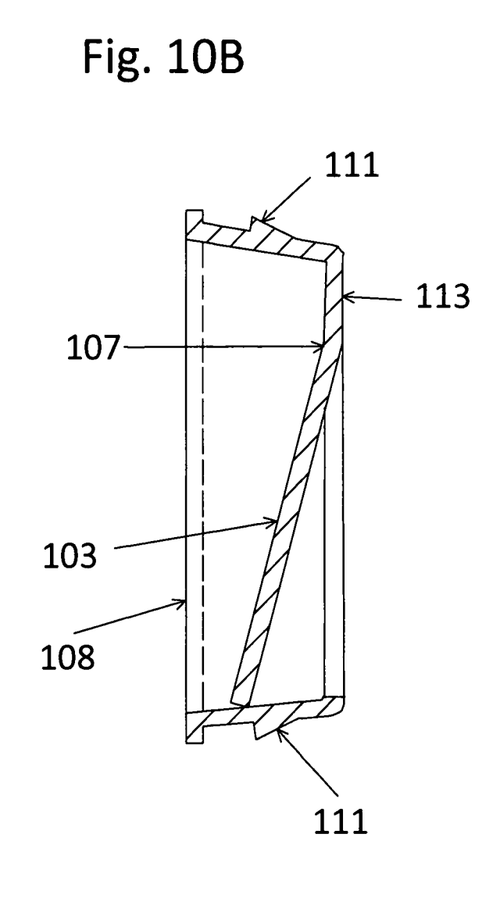
FIG. 10B depicts a cross-section side view of a cover flap in an angled configuration.

FIG. 10A is a front view of an angled flap configuration and FIG. 10B is a side view cross-section of an end cap with an angled flap configuration. FIG. 10A depicts an end cap (100). Shown are the aperture cover (102), the cover flap (103), a flange (108), protrusions (111), and a cover flap connection (106). FIG. 10B depicts a side view cross-section of FIG. 10A with protrusions (111), a flex zone (107), a first end (113), a flange (108), and a cover flap (103). The cover flap is shown in an angled configuration and in a closed position, with the cover flap making contact with the inner surface of the coupler.

Figure 11:
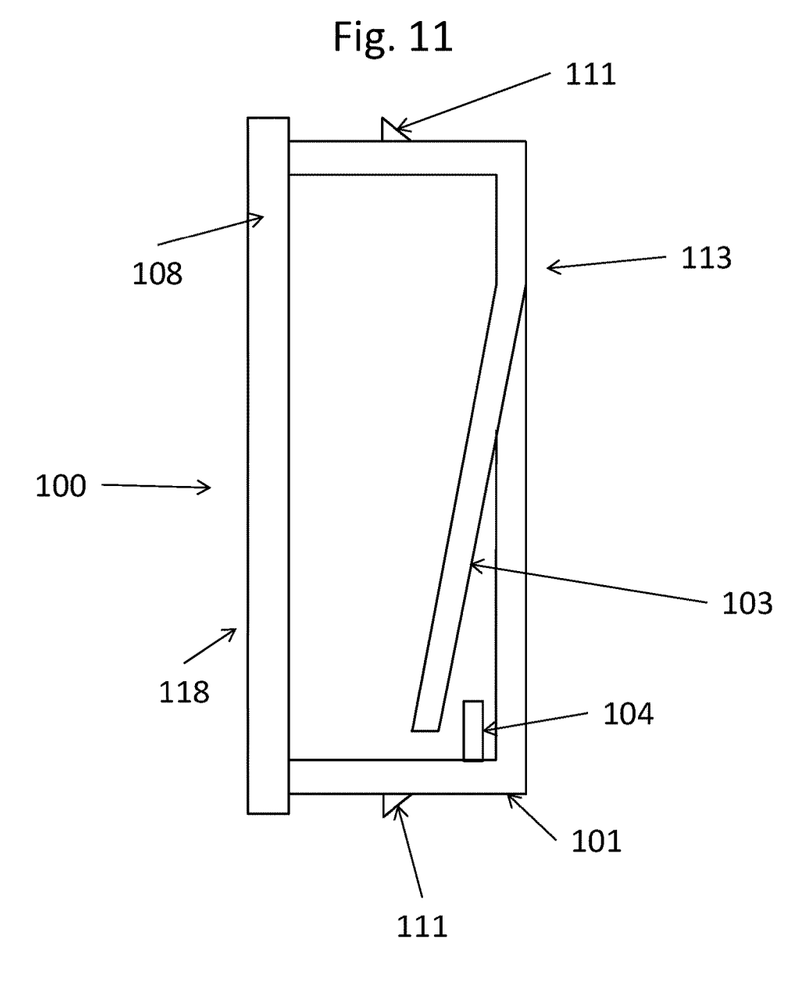
FIG. 11 depicts a cross-section side view of a cover flap with a stopper protruding from the coupler inner surface.

FIG. 11 depicts a cross-section view of an embodiment of an end cap (100). Shown is a coupler (101) with protrusions (111), a first end (113), a flanged second end (118), a flange (108), at least one stopper (104), and a cover flap (103). In this embodiment, the at least one stopper (104) may also extend from the inner surface of the coupler (101) to prevent the cover flap (103) from moving inwardly past the at least one stopper (104). In such a configuration the at least one stopper (104) may be part of the aperture cover or an extension from the coupler (101). The at least one stopper (104) may comprise the lip or may extend from the inner surface of the coupler in a lipless or minimal lip configuration. The at least one stopper (104) extends from the inner surface of the coupler (101) in such a way so that it makes functional contact with the inner surface of the cover flap (103) when the cover flap (103) is in a closed position.

Figure 12A:
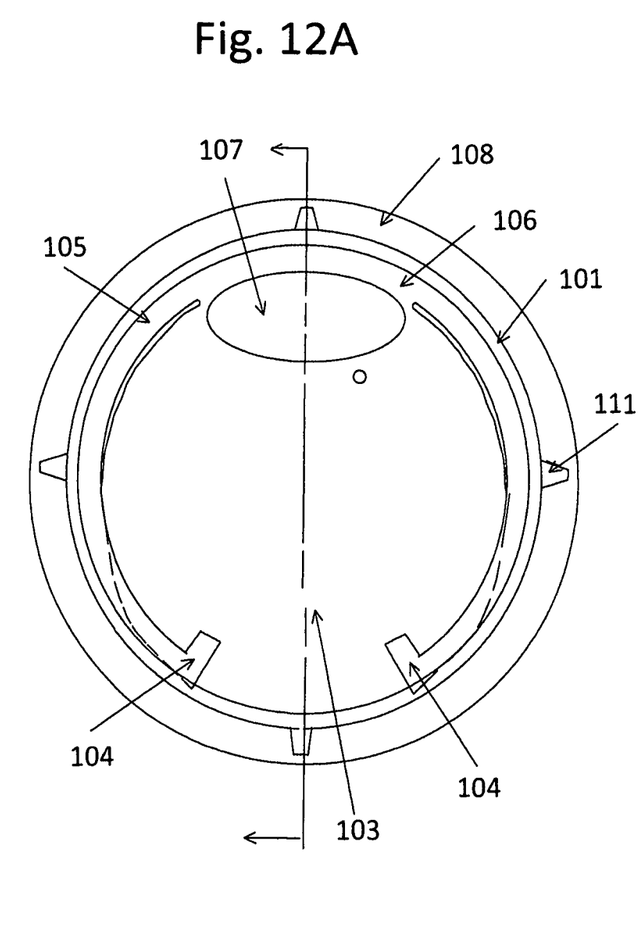
FIG. 12A depicts a rear view of an embodiment of the invention with two stoppers emanating from the aperture cover lip.

FIG. 12A depicts a rear view of an embodiment of the invention with at least one stopper (104) emanating from the aperture cover lip (105). Also shown are a cover flap (103), a lip (105), a flex zone (107), a flap connector (106), a flange (108), a coupler (101), and protrusions (111). In this embodiment, the stoppers (104) are shown protruding from inner lip surface of the lip (105). The at least one stopper (104) may be positioned to minimize debris buildup.

Figure 12B:
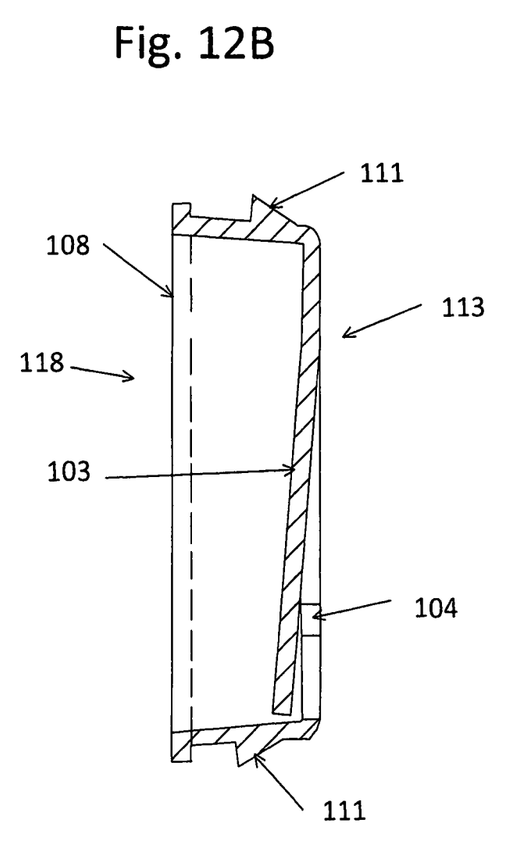
FIG. 12B depicts a cross-section side view of an embodiment of the invention with two stoppers emanating from the aperture cover lip.

FIG. 12B depicts a cross-section side view of an embodiment of the invention with two stoppers emanating from the aperture cover lip (105). Also shown are the cover flap (103), one stopper (104), protrusions (111), a flange (108), the first end (113), and the flanged second end (118). The at least one stopper (104) is shown protruding from the lip (105) and is also shown to be in the same plane as the lip (105). The cover flap (103) is shown in a closed position with the inner surface of the cover flap (103) shown in contact with the stoppers (104). The cover flap is no longer in the plane.

Single walled, double walled, or higher number walled corrugated drain pipe is commonly made from polyethylene (PE). However, the composition of the corrugated pipe that the present invention connects to or snaps into may be of any material or material composition. Drain pipes may also have a single or higher number walled construction that has at least one pipe wall constructed from polyvinyl chloride (PCV). PVC pipes tend to be smooth and not corrugated. There are also pipes that have a combination of smooth and corrugated walls in multi-walled configurations.

The present invention may be made from any polymer, but it will most commonly comprise PE. Polyethylene comes in a number of variants, with the most common being low density PE (LDPE), high density (HDPE), or linear low density PE (LLDPE). Other variants may include but are not limited to ultra-high molecular weight PE or metallocene PE. This invention is most likely to be made from HDPE and/or LLDPE. PE and PE variants are suited for fabrication through a molding process and may be used for creating a single piece construction part, or minimal pieces construction part. PE and PE variants are also suitable for connection with existing single-walled and double-walled corrugated piping, single-walled and double-walled PVC piping, and combinations of corrugated and smooth multi-walled piping.

The drain pipe end cap male connector (112) may be used for connection to corrugated pipes (110) with internal corrugation. The drain pipe end cap (100) female connector (116) may be used for connection to corrugated pipes (110) with external corrugation and is not dependent on internal pipe structure.

The drain pipe end cap (100) may have more than one detachable part or component but a single piece construction is preferred as it should simplify installation, use, manufacturing, and maintenance. The drain pipe end cap (100) described herein is a single piece construction part. The coupler (101) portion of the drain pipe end cap (100) has a first end (113) and a flanged second end (118). The coupler (101) may be a tubular construction, with the coupler (101) being circular, square, or rectangular on the outer surface or inner surface perimeter or both. There may be applications where the exterior surface shape of the coupler (101) may be one shape, while the interior surface shape may be another. The shape of the coupler (101) is most likely to be circular but may be made in a different shape, depending on the application and the shape of the corrugated pipe (110) to which it is intended to connect. The most commonly used corrugated pipe (110) is circular but other variants may exist, depending on the application.

The coupler (101), may act as a male connector (112) or as a female connector (116) or both (not shown), depending on the need. For single walled corrugated pipe, a male connector (112) may be most common. Single walled corrugated pipes normally have corrugated interiors, suitable for male connector (112) connection. For double walled pipe, a female connector (116) may be more suitable, as the inner pipe or inner wall may have a smooth interior surface, lessening the latching effectiveness of a male connector (112). An embodiment of the invention may have a female connector (116) configuration where a sleeve (117), in combination with protrusions (111), is used to connect to the outside of either a single or double walled or multi-walled corrugated pipe.

For male connectors, protrusions (111) extending in an outwardly direction from the surface of the coupler (101), may be one embodiment of the invention. The protrusions (111) may be substantially perpendicular to the outer surface of the coupler (101) but may vary with the specific configuration of the type of connector.

Two types of female connectors are likely to be common. A female pipe connector (116) may have a sleeve (117) with the protrusions (111) extending inwardly from the perimeter surface of the sleeve (117), for securely connecting the female pipe connector (116) onto the exterior of a corrugated pipe (110). This embodiment may have a fixed sleeve (117) connected to the end cap in a single piece construction or it may have a removable sleeve wherein a male connector fits into a detachable sleeve (119) for connection to the exterior of a corrugated pipe (110). The fixed sleeve (117) may extend from the shoulder (120). The second type of female connector (not shown) has a coupler (101) similar to the male connector (112), except with the protrusions (111) extending inward from the inner surface of the coupler (not shown), allowing placement of the drain pipe end cap (100) on the outside of a corrugated pipe (not shown). The aperture cover (102) may be positioned on or towards the flange (108) end of the device, with the protrusions (111) facing inward, and thereby creating a female connector (not shown) for snapping onto the exterior of a corrugated pipe (110). Either variant of the female connector may be used with single walled or double walled or multi walled corrugated pipe.

The at least one aperture cover (102) covers the opening of the coupler's (101) tubular configuration, either at the first end (113) of the coupler (101), the flanged second end (118), or at some point (not shown) in between the two ends of the coupler tube.

The aperture cover (102) comprises a cover flap (103) and thus the cover flap (103) may be located at either end or in between the ends of the coupler (101). The aperture cover (102) may be substantially perpendicular to the inner coupler (101) surface. The aperture cover may also be at an angle to the inner coupler (101) surface but is less than substantially perpendicular, so that the aperture cover (102) substantially covers the tubular opening of the coupler (101). In the angled configuration, the aperture cover (102), the cover flap (103) and the flap connector (106) may be in substantially the same plane when the cover flap (103) is closed. In the angled configuration, the cover flap (103) opens in the direction of the water, effluent, and debris flow. If there is a lip (105), it may be substantially in the same plane as the aperture cover (102). The presence of at least one stopper may move the cover flap (103) outward. The lip (105) may cover the entire perimeter of the cover or it may have at least one gap or lower side to prevent debris from catching. The cover flap may be any shape or geometry but will most commonly have a shape which is similar to the shape of the inner surface perimeter (not shown) of the coupler (101). The cover flap (103) is connected (106) to aperture cover (102) along the inner surface perimeter of the coupler's (101) inner surface at at least one point. To accommodate the angled configuration, the cover flap (103) may be elongated from top to bottom and may be narrower on the sides than would a cover flap (103) positioned to be in substantially perpendicular when closed. The cover flap (103) acts in such a way as to deter animals from entering the pipe but to allow water, effluent, and debris to exit the pipe. The cover flap (103) acting in conjunction with the stopper (104) enhances animal entry prevention. When in the closed position, the cover flap (103) acts as a barrier to animal entry but may still allow weeping or seepage.

The ability of the cover flap (103) to effectively act as intended is related to the length of the cover flap connection (106) or the number of points of connection (106). The size of the flex zone (107) and the water pressure required to open the cover flap (103) is also related to the length of the cover flap connection (106) or the number of points of connection (106). The cover flap (103) takes advantage of the material memory of PE to help close the flap and to keep the flap closed when it is closed. The addition of more material to the cover flap connection (106), making it thicker, would help to adjust stiffness, rigidity, and memory. The flexibility of a cover flap made from PE is that once it is placed within the pipe, the pipe itself adds rigidity to the cover flap, thereby preventing the flap from flexing in a direction into the pipe. This feature helps to keep the flap closed against animal incursion attempts. Such a construction does not require hinges or springs to close the cover flap, as plastic memory returns the cover flap (103) to a closed state after any liquid and debris have drained. The cover flap (103) flexes in the outward direction of water flow, around the flex zone (107), after a threshold force has been reached. Other polymers, having similar properties, may be used in place of PE.

The flex zone (107) differs from a living hinge in that the cover flap (103) material and cover flap connection (106) are generally of a uniform material thickness, whereas the living hinge is generally understood to be a thin flexible web connecting two relatively rigid plastic pieces so as to create a snapping action. The flex zone (107) is an area that encompasses the flap connection (106) and the cover flap (103), creating a bending area or zone. By virtue of having a bending area, the flex zone (107) also differs from a hinge, in that a hinge generally rotates around a fixed line, such as pivot pins, or an axial shaft.

The addition of a stopper (104) to the cover flap (103) or a stopper (104) extending from the coupler, acts to prevent the cover flap (103) from moving inwards, so as to deter animals from entering the pipe. If the opening of the cover flap (103) is made smaller by increasing the number of connection points or the length of a connection line along the inner surface perimeter, the force required to open the cover flap (103) would increase. Another alternative embodiment may include an outward or inward force being imparted on the cover flap connection (106). With the addition of at least one stopper, the application of an inward force to the cover flap (103) would create sufficient tension in the form of rotational force so as to deter animals from entering the corrugated pipe (110) while allowing water and debris to exit when the water and debris exert a sufficient pressure on the cover flap (103).

The aperture cover (102) may or may not have a lip (105). A lip (105) may be used for the purposes of allowing the stopper (104) to connect, hook, or brace against so that the cover flap (103) is prevented from moving inward. A lip (105) may also have at least one stopper (104) extending from it so as to prevent the cover flap (103) from moving inward. If a lip (105) does not exist, a stopper (104) may still be used to brace against the inner surface perimeter of the coupler (101). The cover flap (103) may cover a substantially larger area of the aperture cover as compared to the lip (105). The cover flap (103) and cover flap connection (106) may cover substantially all or even all of the aperture cover (102) area.

The most common embodiment of the aperture cover (102), cover flap (103), cover flap connector (106), and with or without a lip, will be in a substantially perpendicular alignment with the coupler (101). However, other embodiments may be used. One such embodiment may have the entire aperture cover (102) at an angle (not shown) within the inner surface perimeter of the tube of the coupler (101) yet still covering the tubular aperture. A further embodiment may have the cover flap (103) elongated and positioned at an angle where the lower edge of the cover flap (103) is closer to the flange (108) than the connection end (106), so as to only allow the cover flap (103) to open in the direction of water and debris flow.

The flanged second end (118) of the coupler (101) may be any configuration. A very common configuration is an angled outlet (114).

The protrusions (111) are for connection to the single walled or double walled corrugated pipe. The protrusions (111) are from either the outer surface or inner surface of the coupler (101) or on the inner surface of the sleeve (117). In certain embodiments, the protrusions (111) may go through the coupler (101). The connectors will most commonly comprise latches, catches, locks, ridges, spikes, barbs, and combinations thereof. However, any similar connector or attachment device capable of attaching to the grooved portion of corrugated pipe (110) and preventing outward motion of the device may be used. In the most common male embodiment of the invention the protrusions (111) are to be radially pointing outwardly from outer surface of the male connector (112) of the coupler (101). In the most common female embodiment of the invention, the protrusions (111) are to be radially pointing inwardly from the inner surface of the sleeve (117) and female connector (116) of the coupler (101).

NON-LIMITING EMBODIMENTS

Embodiment 1 is a drain pipe end cap having a coupler, at least one stopper, and at least one aperture cover. The coupler has a first end, a flanged second end, an outer surface, and an inner surface. The coupler has a pipe connector that is a male connector and/or a female connector. The at least one aperture cover is located at the first end of the coupler and/or at the flanged second end of the coupler, and/or at a position in between at the first end of the coupler and at the flanged second end of the coupler. The at least one aperture cover comprises a cover flap and the cover flap is connected to at least one point of the perimeter along the upper half of the inner surface of the aperture cover. The cover flap has an edge, an outer surface, and an inner surface. The coupler, the at least one stopper, the at least one aperture cover, the cover flap connection, and the cover flap are of a single piece construction.

Embodiment 2 is the aperture cover of embodiment 1 where the cover flap is connected to at least one point of the perimeter along the upper half of the inner surface of the aperture cover and comprises a flex zone.

Embodiment 3 is the at least one aperture cover of embodiment 2 further having a lip along at least a portion of the aperture cover perimeter, and with said lip substantially in the same plane as the cover flap when the cover flap is closed, and said lip having an outer perimeter and inner perimeter, an inner lip surface and an outer lip surface. The cover flap has at least one stopper on the outer surface of the cover flap, the at least one stopper extending past the edge of the cover flap so that the at least one stopper makes functional contact with the outer lip surface when the edge of the cover flap outer surface is substantially in the same plane as the outer lip surface.

Embodiment 4 is the at least one aperture cover of embodiment 2 wherein the cover flap and the at least one point to which the cover flap is connected comprise substantially all of the aperture cover. The cover flap has the at least one stopper on the outer surface of the cover flap, the at least one stopper extending past the edge of the cover flap so that the at least one stopper makes functional contact with the inner surface of the coupler when the cover flap is closed.

Embodiment 5 is the at least one aperture cover of embodiment 2 wherein the cover flap and the at least one point to which the cover flap is connected comprises an angled configuration and comprising substantially all of the aperture cover when the cover flap is closed.

Embodiment 6 is the at least one aperture cover of embodiment 2 comprising the at least one stopper extending inwardly from a portion of the aperture cover perimeter, with the at least one stopper making functional contact with the inner surface of the cover flap when the cover flap is closed.

Embodiment 7 is the coupler of embodiment 2 wherein the at least one stopper extends inwardly from the inner surface of the coupler, in close proximity to the aperture cover, wherein the at least one stopper makes functional contact with the inner surface of the cover flap when the cover flap is closed.

Embodiment 8 is the drain pipe end cap of embodiment 2 where the single piece construction comprises polyethylene.

Embodiment 9 is the drain pipe end cap of embodiment 2 further comprising a sleeve, wherein the sleeve has a substantially tubular configuration and has an outer surface and an inner surface. The coupler is placed within the sleeve and the sleeve connects to the coupler with the sleeve extending from the flanged second end in the direction of the first end and where the sleeve has at least one female connector.

Embodiment 10 is a drain pipe end cap having a coupler, at least one stopper, a sleeve and at least one aperture cover. The coupler has a first end, a shoulder end, an outer surface, and an inner surface. The sleeve covers the coupler, the sleeve extending from the shoulder end in the direction of the first end, and the sleeve has an outer surface and an inner surface. The sleeve has a substantially tubular configuration and the coupler has a substantially tubular configuration. The sleeve has a pipe connector and the coupler has a pipe connector with the pipe connector being a male connector and/or a female connector. The at least one aperture cover is located at the first end of the coupler and/or at the flanged second end of the coupler, and/or at a position in between at the first end of the coupler and at the flanged second end of the coupler. The at least one aperture cover comprises a cover flap. The cover flap is connected to at least one point of the perimeter along the upper half of the inner surface of the aperture cover with the cover flap having an edge, an outer surface, and an inner surface. The coupler, the sleeve, the at least one aperture cover, the cover flap connection, and the cover flap are of a single piece construction.

Embodiment 11 is the aperture cover of embodiment 10 wherein the cover flap connected to at least one point of the perimeter along the upper half of the inner surface of the aperture cover has a flex zone.

Embodiment 12 is the at least one aperture cover of embodiment 11 further comprising a lip along at least a portion of the aperture cover perimeter, and with said lip substantially in the same plane as the cover flap when the cover flap is closed, and said lip having an outer perimeter and inner perimeter, an inner lip surface and an outer lip surface. The cover flap has the at least one stopper on the outer surface of the cover flap, the at least one stopper extending past the edge of the cover flap so that the at least one stopper makes functional contact with the outer lip surface when the edge of the cover flap outer surface is substantially in the same plane as the outer lip surface.

Embodiment 13 is the at least one aperture cover of embodiment 11 wherein the cover flap and the at least one point to which the cover flap is connected comprises substantially all of the aperture cover. The cover flap has at least one stopper on the outer surface of the cover flap, the at least one stopper extending past the edge of the cover flap so that the at least one stopper makes functional contact with the inner surface of the coupler when the cover flap is closed.

Embodiment 14 is the at least one aperture cover of embodiment 11 where the cover flap and the at least one point to which the cover flap is connected have an angled configuration and comprise substantially all of the aperture cover when the cover flap is closed.

Embodiment 15 is the at least one aperture cover of embodiment 11 comprising at least one stopper extending inwardly from a portion of the aperture cover perimeter, wherein the at least one stopper makes functional contact with the inner surface of the cover flap when the cover flap is closed.

Embodiment 16 is the coupler of embodiment 11 wherein the at least one stopper extends inwardly from the inner surface of the coupler, in close proximity to the aperture cover, wherein the at least one stopper makes functional contact with the inner surface of the cover flap when the cover flap is closed.

Embodiment 17 is the drain pipe end cap of embodiment 11 wherein the single piece construction comprises polyethylene.

Embodiment 18 is any one of embodiments 1-17 combined with any one or more embodiments 2-17.

What is claimed is:

1. A drain pipe end cap comprising a coupler, at least one stopper, and at least one aperture cover;
   has a first end, a flanged second end, an outer surface, and an inner surface;
   the coupler has a pipe connector is configured to positively engage a drain pipe; and
   the at least one aperture cover is located at a position selected from a group consisting of at the first end of the coupler, at the flanged second end of the coupler, and at a position in between at the first end of the coupler and at the flanged second end of the coupler;
   the at least one aperture cover comprises a cover flap connected to at least one point of a perimeter along an upper half of an inner surface of the at least one aperture cover via a flap connector;
   wherein the aperture cover, cover flap, and flap connector are coplanar and the cover flap and flap connector are generally of a uniform material thickness;
   said cover flap has an edge, an outer surface, and an inner surface; and
   the coupler, the at least one stopper, the at least one aperture cover, the flap connector, and the cover flap are of a single piece construction and of a material having shape memory such that the cover flap is configured to bend about a flex zone after a threshold force has been reached and return to the coplanar position when the force has been released.

2. The drain pipe end cap of claim 1 wherein the cover flap connected to at least one point of the perimeter along the upper half of the inner surface of the aperture cover comprises the flex zone.

3. The drain pipe end cap of claim 2 further comprising a lip wherein the aperture cover has the lip along at least a portion of the aperture cover perimeter, and with said lip substantially in the same plane as the cover flap when the cover flap is closed, and said lip having an outer perimeter, an inner perimeter, an inner lip surface and an outer lip surface, wherein
   the cover has the at least one stopper on the outer surface of the cover flap, the at least one stopper extending past the edge of the cover flap so that the at least one stopper makes functional contact with the outer lip surface when the edge of the cover flap outer surface is substantially in the same plane as the outer lip surface.

4. The drain pipe end cap of claim 2 wherein the cover flap and the at least one point to which the cover flap is connected comprising substantially all of the aperture cover wherein the cover flap has the at least one stopper on the outer surface of the cover flap, the at least one stopper extending past the edge of the cover flap so that the at least one stopper makes functional contact with the inner surface of the coupler when the cover flap is closed.

5. The drain pipe end cap of claim 2 wherein the cover flap and the at least one point to which the cover flap is connected comprises an angled configuration and comprising substantially all of the aperture cover when the cover flap is closed.

6. The drain pipe end cap of claim 2 comprising the at least one stopper extending inwardly from a portion of the aperture cover perimeter, wherein the at least one stopper makes functional contact with the inner surface of the cover flap when the cover flap is closed.

7. The drain pipe end cap of claim 2 wherein the at least one stopper extends inwardly from the inner surface of the coupler, in close proximity to the aperture cover, wherein the at least one stopper makes functional contact with the inner surface of the cover flap when the cover flap is closed.

8. The drain pipe end cap of claim 2 wherein the single piece construction comprises polyethylene.

9. The drain pipe end cap of claim 2 further comprising a sleeve;
   wherein the sleeve has a substantially tubular configuration and has an outer surface and an inner surface; wherein
   the coupler is placed within the sleeve and the sleeve connects to the coupler; wherein
   the sleeve extends from the flanged second end in the direction of the first end; and
   wherein said sleeve has at least one female connector.

10. The drain pipe end cap of claim 2 comprising a coupler, at least one stopper, a sleeve and at least one aperture cover;
    wherein the coupler has a first end, a shoulder end, an outer surface, and an inner surface; wherein
    the sleeve covers the coupler, the sleeve extending from the shoulder end in the direction of the first end, and said sleeve has an outer surface and an inner surface; wherein
    the sleeve has a substantially tubular configuration; wherein
    the coupler has a substantially tubular configuration; wherein the sleeve has a pipe connector and the coupler has a pipe connector; wherein the pipe connector is selected from a group consisting of a male connector, a female connector, and combinations thereof;

and wherein the at least one aperture cover is located at a position selected from a group consisting of at the first end of the coupler, at the flanged second end of the coupler, and at a the position in between at the first end of the coupler and at the flanged second end of the coupler; wherein at least one aperture cover comprises a cover flap; wherein the cover flap is connected to at least one point of the perimeter along the upper half of the inner surface of the aperture cover; wherein said cover flap has an edge, an outer surface, and an inner surface; and wherein the coupler, the sleeve, the at least one aperture cover, the cover flap connection, and the cover flap are of a single piece construction.

11. The drain pipe end cap of claim 10 wherein the cover flap connected to at least one point of the perimeter along the upper half of the inner surface of the aperture cover comprises the flex zone.

12. The drain pipe end cap of claim 11 further comprising a lip wherein the aperture cover has the lip along at least a portion of the aperture cover perimeter, and with said lip substantially in the same plane as the cover flap when the cover flap is closed, and said lip having an outer perimeter, an inner perimeter, an inner lip surface and an outer lip surface; wherein the cover flap has the at least one stopper on the outer surface of the cover flap, the at least one stopper extending past the edge of the cover flap so that the at least one stopper makes functional contact with the outer lip surface when the edge of the cover flap outer surface is substantially in the same plane as the outer lip surface.

13. The drain pipe end cap of claim 11 wherein the cover flap and the at least one point to which the cover flap is connected comprising substantially all of the aperture cover wherein the cover flap has the at least one stopper on the outer surface of the cover flap, the at least one stopper extending past the edge of the cover flap so that the at least one stopper makes functional contact with the inner surface of the coupler when the cover flap is closed.

14. The drain pipe end cap of claim 11 wherein the cover flap and the at least one point to which the cover flap is connected comprises an angled configuration and comprising substantially all of the aperture cover when the cover flap is closed.

15. The drain pipe end cap of claim 11 comprising at least one stopper extending inwardly from a portion of the aperture cover perimeter, wherein the at least one stopper makes functional contact with the inner surface of the cover flap when the cover flap is closed.

16. The drain pipe end cap of claim 11 wherein the at least one stopper extends inwardly from the inner surface of the coupler, in close proximity to the aperture cover, wherein the at least one stopper makes functional contact with the inner surface of the cover flap when the cover flap is closed.

17. The drain pipe end cap of claim 11 wherein the single piece construction comprises polyethylene.

* * * * *